United States Patent [19]

Brömer

[11] 4,092,887

[45] June 6, 1978

[54] METHOD FOR AUTOMATICALLY VARYING THE FEED RATE OF A WORKPIECE CARRIAGE IN A MACHINE TOOL

[75] Inventor: Günter Brömer, Spardorf, Germany

[73] Assignee: Siemens Aktiengesellschaft, Munich, Germany

[21] Appl. No.: 802,968

[22] Filed: Jun. 2, 1977

[30] Foreign Application Priority Data

Jun. 28, 1976 Germany .............................. 2628961

[51] Int. Cl.² ............................................. G05B 19/18
[52] U.S. Cl. .......................................... 83/56; 83/71; 83/410; 83/916; 214/1 F; 269/56
[58] Field of Search ..................... 83/56, 71, 916, 409, 83/410, 412, 414; 269/56; 214/1 F

[56] References Cited

U.S. PATENT DOCUMENTS 3,664,217  5/1972  Schlewek .......................... 83/916 X

*Primary Examiner*—J. M. Meister
*Attorney, Agent, or Firm*—Kenyon & Kenyon, Reilly, Carr & Chapin

[57] ABSTRACT

A method for automatically varying the feed rate of a moving workpiece carriage in the proximity of permissible terminal positions for the carriage in a machine tool. The machine tool includes a numerical control means for controlling the position of the workpiece carriage and means for determining the position of the workpiece carriage in the machine tool. The improvement comprises storing signals corresponding to a plurality of safety positions of the workpiece carriage located within the terminal positions of the carriage in a memory device provided in the numerical control means. The safety position signals are then compared with measured position signals generated by the position determining means which correspond to the position of the workpiece carriage in the machine tool. The feed rate of the workpiece carriage is automatically reduced by the numerical control means when the safety positions are passed by the workpiece carriage as the carriage moves in a direction towards the terminal positions. The feed rate reduction is cancelled by the numerical control means, however, if a position signal is generated by the numerical control means for moving the workpiece carriage in a direction away from the terminal positions to a position within the safety positions in the machine tool.

1 Claim, 1 Drawing Figure

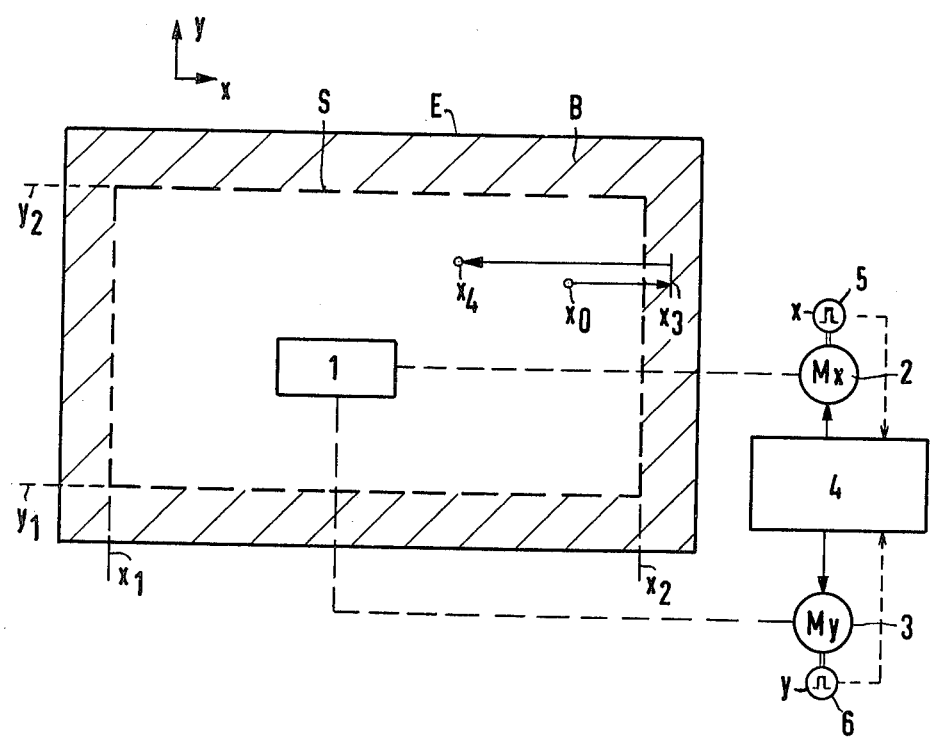

METHOD FOR AUTOMATICALLY VARYING THE FEED RATE OF A WORKPIECE CARRIAGE IN A MACHINE TOOL

BACKGROUND OF THE INVENTION

1. Field of the Invention

The present invention relates to a method for automatically varying the feed rate of a workpiece carriage in a numerically-controlled machine tool in the vicinity of permissible terminal positions for the carriage in the machine tool, and in particular to an improved method for varying the feed rate of a workpiece carriage in a computer-controlled nibbling machine which includes means for determining the position of the workpiece carriage.

2. Description of the Prior Art

Methods of the foregoing type for varying the feed rate of a workpiece carriage in a machine tool are known in the art. See, for example, Siemens AG catalog SINUMERIK 550C, dated October, 1974.

In machine tools in which the workpiece carriage is capable of reaching a high velocity and in which relatively heavy workpieces are operated upon, for example, nibbling machines, the feed rate must be reduced in the vicinity of the terminal positions of the workpiece carriage in order to prevent the occurrence of excessive stress and, in particular, to enable an emergency stop of the workpiece carriage to be effected in any situation. These objectives can theoretically be achieved by utilizing mechanical end switches mounted in the vicinity of the terminal positions of the workpiece carriage to reduce the velocity of the workpiece carriage when they are approached by the carriage. Considerable means are required, however, for the installation and adjustment of such switches. And it is likewise expensive to take into consideration the foregoing factors when programming the numerical control of such a machine tool.

SUMMARY OF THE INVENTION

It is therefore an object of the present invention to provide an improved method for automatically varying the feed rate of a workpiece carriage in a machine tool by means of which the velocity of the workpiece carriage in the boundary regions in the machine tool is automatically adapted to the requirement for an emergency stop of the workpiece carriage.

These and other objects of the invention are achieved in a method for automatically varying the feed rate of a moving workpiece carriage in the proximity of permissible terminal positions for the workpiece carriage in a machine tool. The machine tool includes a numerical control means for controlling the position of the workpiece carriage and means for determining the position of the workpiece carriage in the machine tool. The improvement comprises the steps of storing signals corresponding to a plurality of safety positions of the workpiece carriage located within the terminal positions of the workpiece carriage in a memory device provided in the numerical control means. The safety position signals are then compared with measured position signals generated by the workpiece carriage position determining means corresponding to the position of the workpiece carriage in the machine tool. The feed rate of the workpiece carriage is automatically reduced by the numerical control means when the safety positions are passed by the workpiece carriage as the carriage moves in a direction towards the terminal positions thereof. The feed rate reduction is cancelled by the numerical control means if a position signal is generated by the numerical control means for moving the workpiece carriage in a direction away from the terminal positions to a position within the safety positions in the machine tool.

Since means for determining the position of the workpiece carriage are already available in the machine tool, and the required storage capacity is available if the machine tool is a computer-controlled machine tool, the additional monitoring of the inventive method requires very little additional expense.

These and other novel features and advantages of the inventive method will be discussed in greater detail in the following detailed description.

BRIEF DESCRIPTION OF THE DRAWING

The drawing is a schematic view of a numerically-controlled machine tool including a workpiece carriage the feed rate of which may be automatically varied in accordance with the improved method of the present invention.

DETAILED DESCRIPTION

Referring now to the drawing, there is shown a workpiece carriage 1 of a numerically-controlled nibbling machine which is movable in mutually perpendicular directions, indicated by the perpendicular axes $x$ and $y$, within specified operating boundaries in the machine tool the outer limits of which, i.e., the terminal positions, are identified by reference character E. Whenever the workpiece carriage reaches any of the terminal positions E, the machine tool is automatically stopped.

Within terminal positions E is a safety region B which must not be traversed at the maximum feed rate of the workpiece carriage. This maximum feed rate may be 50m/min and must be reduced automatically. The inner boundary of safety region B is indicated by the dashed lines in the drawings and is identified by reference character S. The safety position values $x1$, $x2$ and $y1$ and $y2$ are assigned to the inner boundary lines of safety region B. Each of these values are stored in the memory of a numerical control 4 of the nibbling machine.

Numerical control 4 generates command signals which control feed motors 2 and 3 which, in turn, control movement of workpiece carriage 1 in the machine tool in a manner known in the art. The actual position of the workpiece carriage at any time is determined by measuring systems 5 and 6 coupled to feed motors 2 and 3.

In operation, if the workpiece carriage is moved, for example, from point $x0$ to point $x3$, a command signal to reduce the feed rate is generated by numerical control 4 when the workpiece carriage reaches a position which corresponds to safety position value $x2$. As a result, the workpiece carriage continues to move towards point $x3$ at a reduced feed rate. If at this point a command signal is generated by numerical control 4 for moving workpiece carriage 1 to a point $x4$ located within the inner boundary S of the safety region B, the feed rate reduction is immediately cancelled by numerical control 4 since the workpiece carriage will then come to rest within the terminal positions E even if an emergency stop is required to be effected in safety zone B.

In carrying out the inventive method, the machine tool is run at maximum speed, i.e., is optimally loaded, also in the safety region B whenever this is permissible.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a method for automatically varying the feed rate of a moving workpiece carriage in the proximity of permissible terminal positions for the carriage in a machine tool including a numerical control means for controlling the position of the workpiece carriage and means for determining the position of the workpiece carriage in the machine tool, the improvement comprising storing signals corresponding to a plurality of safety positions of said workpiece carriage located within said terminal positions of said workpiece carriage in a memory device provided in said numerical control means, and comparing said safety position signals with measured position signals generated by said workpiece carriage position determining means corresponding to the position of said workpiece carriage in said machine tool, said feed rate of said workpiece carriage being automatically reduced by said numerical control means when said safety positions are passed by said workpiece carriage as said carriage moves in a direction towards said terminal positions, said feed rate reduction being cancelled by said numerical control means if a position signal is generated by said numerical control means for moving said workpiece carriage in a direction away from said terminal positions to a position within said safety positions in said machine tool.

* * * * *